Dec. 9, 1958      J. C. SHEPHERD      2,863,305
REFRIGERANT ARTICLE AND COMPOSITION
Filed Aug. 10, 1953      2 Sheets-Sheet 1
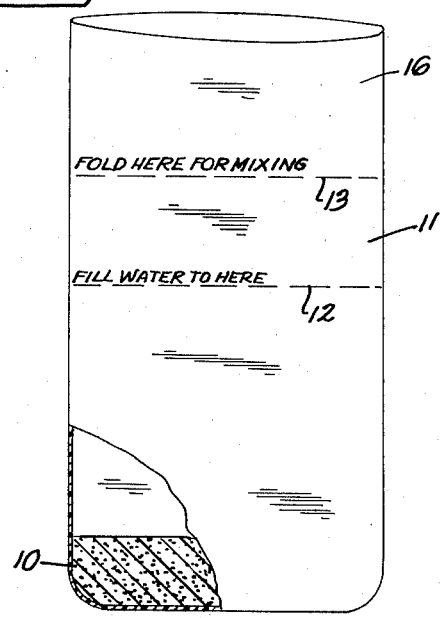
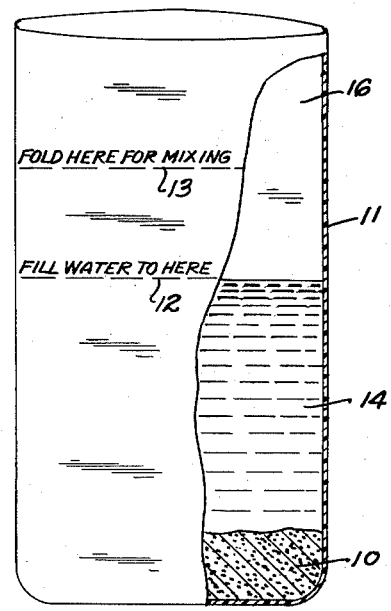
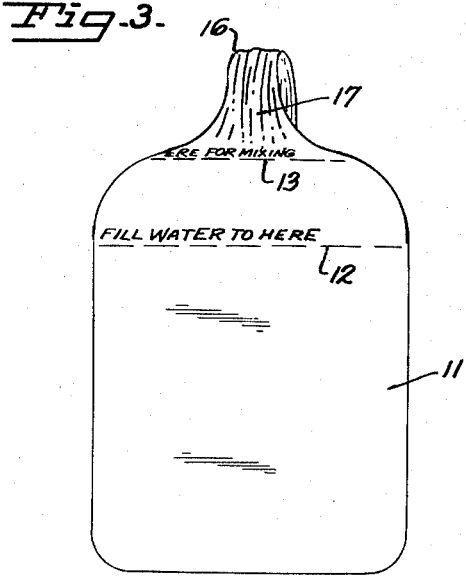
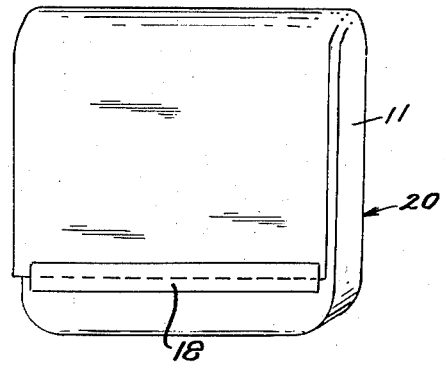
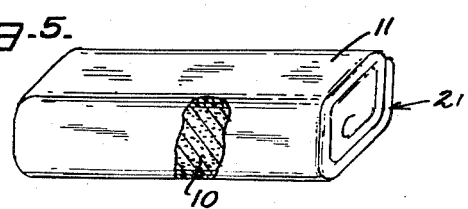
INVENTOR.
JOHN C. SHEPHERD
BY
ATTORNEY

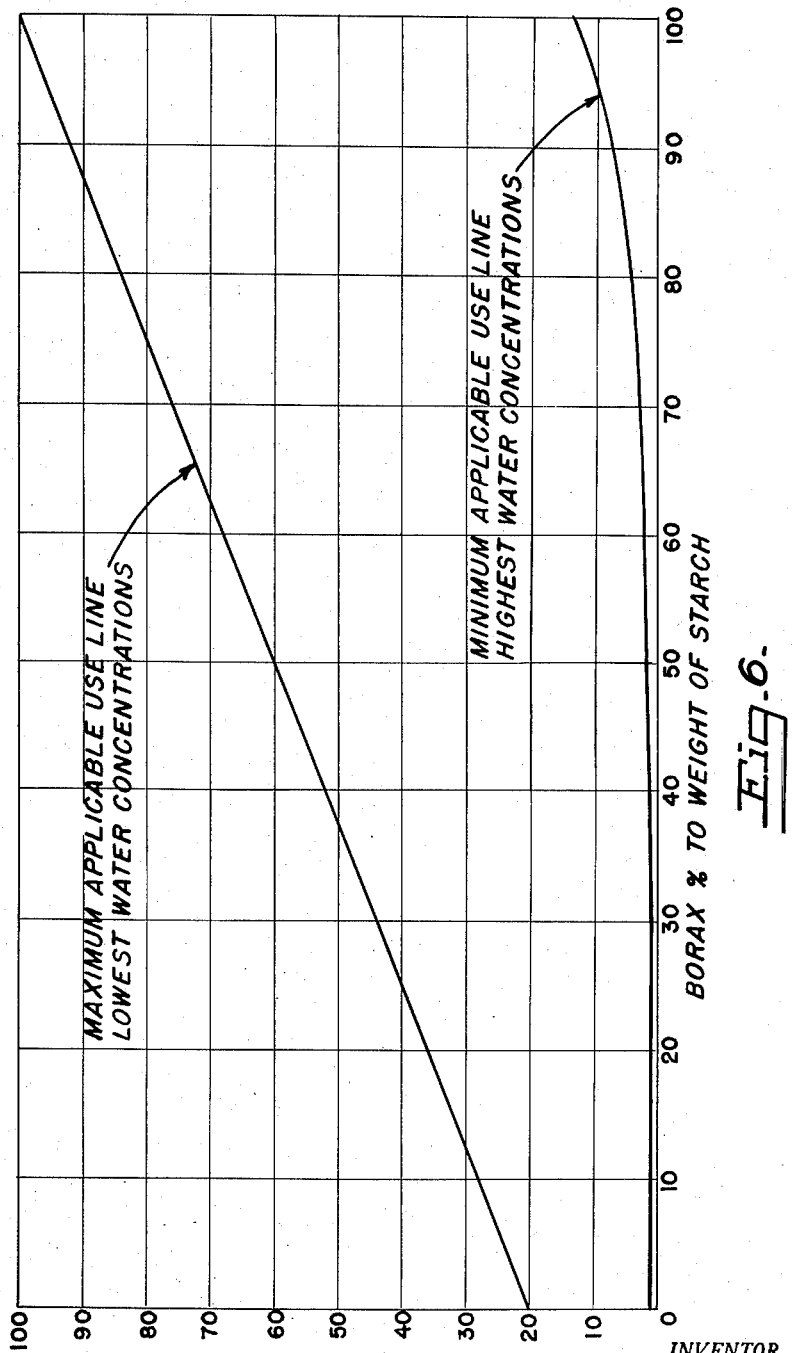

United States Patent Office  2,863,305
Patented Dec. 9, 1958

2,863,305

REFRIGERANT ARTICLE AND COMPOSITION

John C. Shepherd, Monrovia, Calif.

Application August 10, 1953, Serial No. 373,249

13 Claims. (Cl. 62—530)

This invention relates to an improved article of manufacture and to an improved composition of matter for use in refrigeration.

In Patents Numbers 2,800,454, 2,800,455, 2,800,456 and 2,803,115, I have disclosed starch gels, so modified and so proportioned that they will not leak water, a fact which makes them a more suitable refrigerant, for many uses, than any other material heretofore known. I have also disclosed the use of packaged gels containing water and gelling agents such as starch, in a combination which achieves such unusual and unexpected results as using a container to protect the gel and the contained gel to seal breaks in the container, and thereby protect the remainder of the gel.

The present invention is directed to improvements that have solved other problems that have arisen with gel refrigerants. One such problem is the transportation problem, which arises because the largest component of a gel is water, which comprises between about 67% and about 95% of the gel, by weight. Therefore, up to the time the refrigerant is ready to be frozen—that is, during its shipment from the manufacturer to the actual user, most of the freight cost is paid to ship water.

A problem related to the transportation problem has been the storage problem, for the water has taken up an excessive amount of space, when gel refrigerants are stored for long periods of time prior to use. It would be of considerable advantage to the user if he could store only the relatively small volume of dry ingredients.

In addition, when the gel is combined with water at a plant and shipped to another location, it does not always have the shape which the final user desires it to have, and reshaping the gel may weaken it or may be otherwise inconvenient. For another thing, one individual user may require a gel of different flexibility or strength from those required by other users, and the ideal consistency of the gel may vary from one use to another by the same user, so that it would be desirable for him to be able to manufacture the gel himself.

Heretofore, the alternative to shipping and storing water in the gel state was to compound the gel from its dry ingredients and water. It saves much of the transportation cost to ship only the dry ingredients, but this has been overbalanced by the high cost of the equipment which is necessary for exact measurement and proper mixture of the components of these gel refrigerants. This expense, plus the amount of space consumed by the setup has placed a small user of gels at a considerable disadvantage with respect to the large users. It simply is not feasible for each small user to measure out the dry ingredients himself.

It is apparent then, that it would be better for these small users to obtain a dry mixture to which they had only to add water. However, ungelatinized starch would have to be boiled, and should be gelatinized before it is mixed with some of the other ingredients that are needed, and this requires the extensive equipment referred to. What is needed is something that could be mixed with cold water to form the gel, and the problem has been that cold water gelling agents, such as pregelatinized starch, have such an affinity for water that they cannot be mixed fast enough, without special equipment, to produce a desirably uniform product.

All these problems have been solved by the present invention which makes it possible to produce a gel by combining cold water with a single dry powder provided by the present invention, and to do so without any special equipment other than the novel article of manufacture itself.

The present invention includes a gelling composition of matter that will combine with cold water slowly enough to permit the thorough mixture necessary for producing a uniform product. It also provides a novel vessel for shipping and storing the dry powder before the gel is made, and provides that this same vessel be the vessel in which the gel is mixed and also be the container for the finished gel.

Other advantages of the invention will appear from the following description of a preferred embodiment, given for illustrative purposes in accordance with 35 U. S. C. 112.

Fig. 1 is a view in elevation, partly in section, of an article embodying the present invention, with the container shown opened for the addition of water.

Fig. 2 is a view similar to Fig. 1 showing the container with the water added.

Fig. 3 is a view similar to Figs. 1 and 2, with the top of the container folded over for mixing, leaving a void area to aid in the mixing.

Fig. 4 is a view in perspective of the completed refrigerant article.

Fig. 5 is a view in perspective, partly in section, of the package, before the addition of water, for shipment of the dry ingredients.

Fig. 6 is a chart showing the amount of hydrophobic agent plotted against borax, for minimum and maximum amounts, with pre-gelatinized starch.

The novel composition of matter is a dry powder that requires only the addition of water and agitation to form, in a few moments, a non-leaking gel. The powder is a combination of two main elements, though it may include additional elements, these main elements being a gelling agent that will react with cold water to form a gel, and a hydrophobic (or lyophobic) agent, which delays the reaction or slows it down, so that it becomes manageable.

The gelling agent may be pregelatinized starch, bentonite, or cellulose gum (CMC). The preferred gelling agent is pregelatinized starch, and when that is used, it is advisable to add borax, which strengthens the gel in accordance with the principles set forth in my copending application, Serial No. 363,186, now Patent 2,800,455, filed June 22, 1953. The gel may also include an additional strengthening and life-extending chemical, such as paraformaldehyde, in accordance with the principles described in the application just mentioned.

The water-hating or hydrophobic substance is just as necessary as the gelling agent. For this, I prefer to use free-flowing starch esters. These are fully described in Patent 2,613,206 issued October 7, 1952, to Carlyle G. Caldwell and assigned to National Starch Products, Inc., who sell it under the trademark "Dry-Flo." Patent 2,613,206 defines these free-flowing starch esters as "a free-flowing ungelatinized starch derivative comprising the product of an ungelatinized starch acid-ester of a substituted dicarboxylic acid of the following formula:

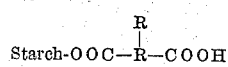

wherein R is a radical from the group of dimethylene and trimethylene radicals and R' is a hydrocarbon substituent from the class consisting of an alkyl, alkenyl, aralkyl, and aralkenyl, reacted with a compound containing a polyvalent metal ion" (claim 1 in Patent 2,613,206). In specific examples a starch acid ester of substituted succinic or glutaric acid (prepared alternately from corn starch, tapioca starch, rice starch, potato starch, and wheat starch by suspending the starch in water containing sodium carbonate or sodium hydroxide, and then adding octenyl, nonenyl, or dicenyl succinic acid anhydride, or triisobutylene succinic acid anhydride, or methylene succinic acid anhydride, or heptyl glutaric acid anhydride) was mixed and reacted with a salt (aluminum sulphate, ferric sulphate, stannic chloride, calcium formate, barium chloride, strontium nitrate, copper sulphate, ceric sulphate, chromic chloride, and zinc chloride being given as examples), and the resultant produce filtered off, and dried. Herein, this product will be referred to as "free flowing starch esters," meaning in this specification and claims, the product defined in the foregoing invention. Another hydrophobic, or lyophobic, agent is talc, and there are others.

The best results are obtained by thoroughly mixing the gelling agent (e. g. pregelatinized starch) and hydrophobic agent (e. g. free flowing starch ester) before combining any remaining dry ingredients, and then mixing all the dry ingredients thoroughly before adding the water.

The hydrophobic agent does not mix readily with water. When it is well mixed with the starch or other gelling agent in the proper proportions, it does not prevent the starch from mixing with water, but does delay the reaction. Time is thereby gained to assure that the water will uniformly penetrate the mass and produce a homogeneous gel.

The amount of hydrophobic agent used depends on: (1) the reaction time or period of delay desired, (2) the amount of water to be used, (3) the amount of borax present, when borax is used, and (4) whether eutectic depressants are added:

(1) Increasing the amount of the water-hating agent relative to the gelling agent increases the time delay, or the length of the reaction or gelling period.

(2) Generally speaking, when much water is added, less hydrophobic agent is necessary to produce a homogeneous product, than when little water is added. For a non-leaking gel, however, the amount of the water must not be excessive.

(3) In general, an increase in the amount of borax will call for an increase in the amount of hydrophobic agent (see the chart of Fig. 6). However, when using starch as the water adsorbing agent and when a low concentration of borax and a high concentration (50% and over) of aldehyde is used, then the hydrophobic agent may be reduced by about one half.

(4) When metal salts, such as common table salt, are added to the starch or other gelling agents to depress the freezing point, then the amount of hydrophobic agent may be reduced.

A preferred formula is:

Example 1

| | Parts |
|---|---|
| Pregelatinized starch | 100 |
| Borax | 20 |
| Paraformaldehyde | 3 |
| Free-flowing starch ester (the water-hating agent) | 3 |

Eventually this amount of dry materials may be combined with about 700 parts of water. The dry ingredients are preferably mixed by first mixing the starch with the starch ester and then adding the other ingredients in any desired manner and order. The above formula may be varied for adaptation to the conditions of use to which the refrigerant is to be put. Talc may be substituted for the starch ester, usually using twice as much talc as starch ester to get approximately the same results. The following table shows the range of values that form a non-leaking gel refrigerant from starch, similar to Example 1:

| | Parts |
|---|---|
| Pregelatinized starch | 100 |
| Borax | 50 to 100 |
| Paraformaldehyde | ½ to 100 |
| Water-hating agent | 1 to 100 |

Sodium chloride, or other soluble metallic salts may be added, up to their saturation point, as eutectic depressants.

Example 2

| | Parts |
|---|---|
| Wyoming bentonite | 100 |
| Talc, U. S. P. | 12.5 |

This can be combined with about 400 parts of water. As before, the proportions may be varied, and free-flowing starch ester may be substituted for talc, using only half as much for approximately the same results.

Example 3

| | Parts |
|---|---|
| Cellulose gum (Hercules Powder Co. "CMC") | 100 |
| Talc U. S. P. | 25 |

This can be combined with about 1200 parts of water, and the proportions may be varied. 12.5 parts of starch ester may be substituted for the talc, and other water-hating (hydrophobic) agents may be used.

For both bentonite and cellulose gum, the range of hydrophobic agents extends from about 2% to 36% of the gelling substance, where a starch ester is used, or about 4% to 72% for talc.

A product incorporating this composition of matter is shown in Fig. 1. The powder 10 is placed in an oversized flexible waterproof bag 11, preferably transparent. The size of the bag 11 bears an important relation to the amount of powder placed in it, partly because this bag 11 constitutes the container for the finished refrigerant and partly because it is the mixing vessel. Consequently, the volume of the bag 11 will be such that it will hold, in addition to the powder 10, between 300 and 1,500 parts of water by weight for each 100 parts of gelatinizing agent, depending upon the use for which the product is to be used. Furthermore, the bag 11 must provide for extra space at the time the material is mixed so that it may be sloshed around.

As Fig. 1 shows, the bag 11 is marked with two lines 12 and 13. The lower line 12 indicates the level to which the bag 11 is filled with water 14, as shown in Fig. 2. The higher line 13 indicates where the open end of the bag is to be closed so as to provide an empty portion 15, equal to about 20% in volume of the bag. The portion 16 that extends above the line 13 is large enough so that it can be folded over (see Fig. 3) after the water 14 has been added to the powder 10 in the container 11, to produce a temporary closure 17. This closure 17 can be held tightly while the container 11 is shaken vigorously to mix the water 14 and powder 10. The extra space available helps greatly during this shaking. After the mixture gels to form the gel 18, the bag 11 may be folded over on the line 12 and taped, welded, seamed, or otherwise secured permanently, as shown in Fig. 4, to provide the finished packaged refrigerant 20.

Fig. 5 shows how the powder 10 may be shipped to the person who is to add the water. The bag 11 is wrapped around and around the powder 10 to make the small package 21, which is but a fraction of the size of the completed refrigerant package 20. This illustrates the great reduction of the shipping bulk made possible by the present invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An article of manufacture from which a packaged refrigerant can be prepared by simply adding water and shaking, comprising a pregelatinized starch mixed with borax and a water-hating agent; and an oversized flexible open-end transparent bag made from waterproof material and able to hold between 3 and 20 times as much water by weight as the starch therein and marked with a first indicating line to indicate the correct proportion of water to be added and having a flexible portion beyond said marking line, with a second line indicating a fold line able to provide the void space necessary for mixing, whereby the container can be folded over at the second line and closed tightly enough to prevent leakage therefrom, while shaking the package with the addition of water, and can later be folded over to the first line for permanent holding of the gel.

2. An article of manufacture from which a packaged refrigerant can be prepared by simply adding water and shaking, comprising a substance that is gelatinizable in cold water, intimately mixed with a hydrophobic agent; and an oversized flexible open-end bag made from waterproof material and able to hold between 3 and 15 times as much water by weight as the mixture therein.

3. An article of manufacture from which a packaged refrigerant can be prepared by simply adding water and shaking, comprising a cold water gelling agent mixed with a water-hating agent; and an oversized flexible open-end bag made from waterproof material and able to hold between 3 and 20 times as much water by weight as the agents therein and marked with an indicating line to indicate the correct proportion of water to be added and having a flexible portion beyond said marking line to provide void space available during mixing, whereby the container can be folded over and closed tightly enough to prevent leakage therefrom while shaking the package after the addition of water, and can later be permanently closed at said marking line for permanent holding of the gel which results.

4. A composition of matter for preparing a gel upon the addition of cold water, said composition consisting essentially of a substance chosen from the group of gelling agents consisting of pregelatinized starch, bentonite and cellulose gum mixed with a free-flowing starch ester as a hydrophobic agent, whereby, when cold water is applied, the gelling action of the gelling agent is delayed by the presence of said hydrophobic agent so that gelling takes place uniformly.

5. A composition of matter adapted to form an homogeneous gel of uniform texture upon the addition of cool water, said composition consisting essentially of a major portion of a gelling substance chosen from the group consisting of pregelatinized starch, bentonite, and cellulose gum, and a minor portion of a hydrophobic agent chosen from the group consisting of talc in a finely powdered state, and the free-flowing starch esters, said hydrophobic agent and said gelling substance being intimately mixed together, whereby, upon the addition of water, said gelling substance will act to form a gel, but will be delayed from premature conglomeration by the presence of said hydrophobic agent.

6. A composition of matter adapted to form an homogeneous gel of uniform texture upon the addition of cool water, said composition consisting essentially of between 50% and 99% of a gelling substance chosen from the group consisting of pregelatinized starch, bentonite, and cellulose gum, and between 1% and 50% of a hydrophobic agent chosen from the group consisting of talc in a finely powdered state, and the free-flowing starch esters, said hydrophobic agent and said gelling substance being intimately mixed together, whereby, upon the addition of water, said gelling substance will act to form a gel, but will be delayed from premature conglomeration by the presence of said hydrophobic agent.

7. A composition of matter requiring only the addition of water to produce a non-leaking gel-type refrigerant, and characterized by the fact that the gel conglomerates uniformly instead of prematurely, said composition consisting essentially of an intimate mixture of powder consisting of between 33% and 94% by weight of pregelatinized starch, between 3% and 33% by weight of borax, and between 1% and 33% of a water-heating agent, said water-hating agent acting to delay premature gelatinization and assuring uniform distribution of the borax in the starch and uniform action of water on the starch.

8. A composition of matter claimed in claim 6 in which there is, in addition, between one-half part and one hundred parts by weight of paraformaldehyde per one hundred parts by weight of pregelatinized starch.

9. A composition of matter consisting essentially of about one hundred parts by weight of bentonite and about twelve and one-half parts by weight of talc, said talc acting to prevent premature wetting of said bentonite, so that when water is added, a uniform gel is formed instead of a premature agglomeration.

10. A composition of matter for controlled gelling upon the addition of water, consisting essentially of about one hundred parts by weight of bentonite, and about two to thirty-six parts by weight of a free-flowing starch ester, said starch ester acting to prevent premature wetting of said bentonite, and thereby causing a delayed-action gelling to take place, which assures uniformly of the gelled product which results when water is added.

11. A composition of matter characterized by uniform gelation upon the addition of cool water without premature agglomeration, and consisting essentially of about one hundred parts by weight of pregelatinized starch, about ten to thirty parts by weight of borax, and about three to twenty parts of a free-flowing starch ester, said starch ester acting as a delaying agent to insure a homogeneous mixture of starch and borax in the finished gel when water is added.

12. A composition of matter for controlled gelling consisting essentially of about one hundred parts by weight of cellulose gum intimately mixed with between two and thirty-six parts of starch ester, said starch ester serving to delay gelation of said cellulose gum upon the addition of water, and thereby serving to provide a homogeneous finished gel.

13. A composition of matter for homogeneous gelation upon the addition of water and shaking consisting essentially of about one hundred parts by weight of cellulose gum and about twenty-five parts by weight of talc, said talc acting to prevent premature wetting of said cellulose gum, and thereby achieve a uniformly constituted gel.

References Cited in the file of this patent

UNITED STATES PATENTS

| | | |
|---|---|---|
| 1,550,650 | Banks | Aug. 18, 1925 |
| 1,742,472 | Holton | Jan. 7, 1930 |
| 1,752,371 | Daniels | Apr. 1, 1930 |
| 1,782,526 | Beardsley | Nov. 25, 1930 |
| 1,904,222 | Halbach | Apr. 18, 1933 |
| 1,973,613 | Cowgill | Sept. 11, 1934 |
| 2,276,220 | Le Veille | Mar. 10, 1942 |
| 2,442,658 | Lloyd | June 1, 1948 |
| 2,613,206 | Caldwell | Oct. 7, 1952 |

FOREIGN PATENTS

| | | |
|---|---|---|
| 440,385 | Canada | May 15, 1947 |

UNITED STATES PATENT OFFICE
CERTIFICATE OF CORRECTION

Patent No. 2,863,305                                               December 9, 1958

John C. Shepherd

It is hereby certified that error appears in the printed specification of the above numbered patent requiring correction and that the said Letters Patent should read as corrected below.

Column 6, line 12, for "water-heating" read -- water-hating --; line 33, for "uniformly" read -- uniformity --.

Signed and sealed this 9th day of June 1959.

(SEAL)
Attest:

KARL H. AXLINE
Attesting Officer

ROBERT C. WATSON
Commissioner of Patents